Jan. 12, 1954  H. M. GREENE  2,665,643
WELL PUMP FILTER ATTACHMENT
Filed Jan. 24, 1951  2 Sheets-Sheet 2
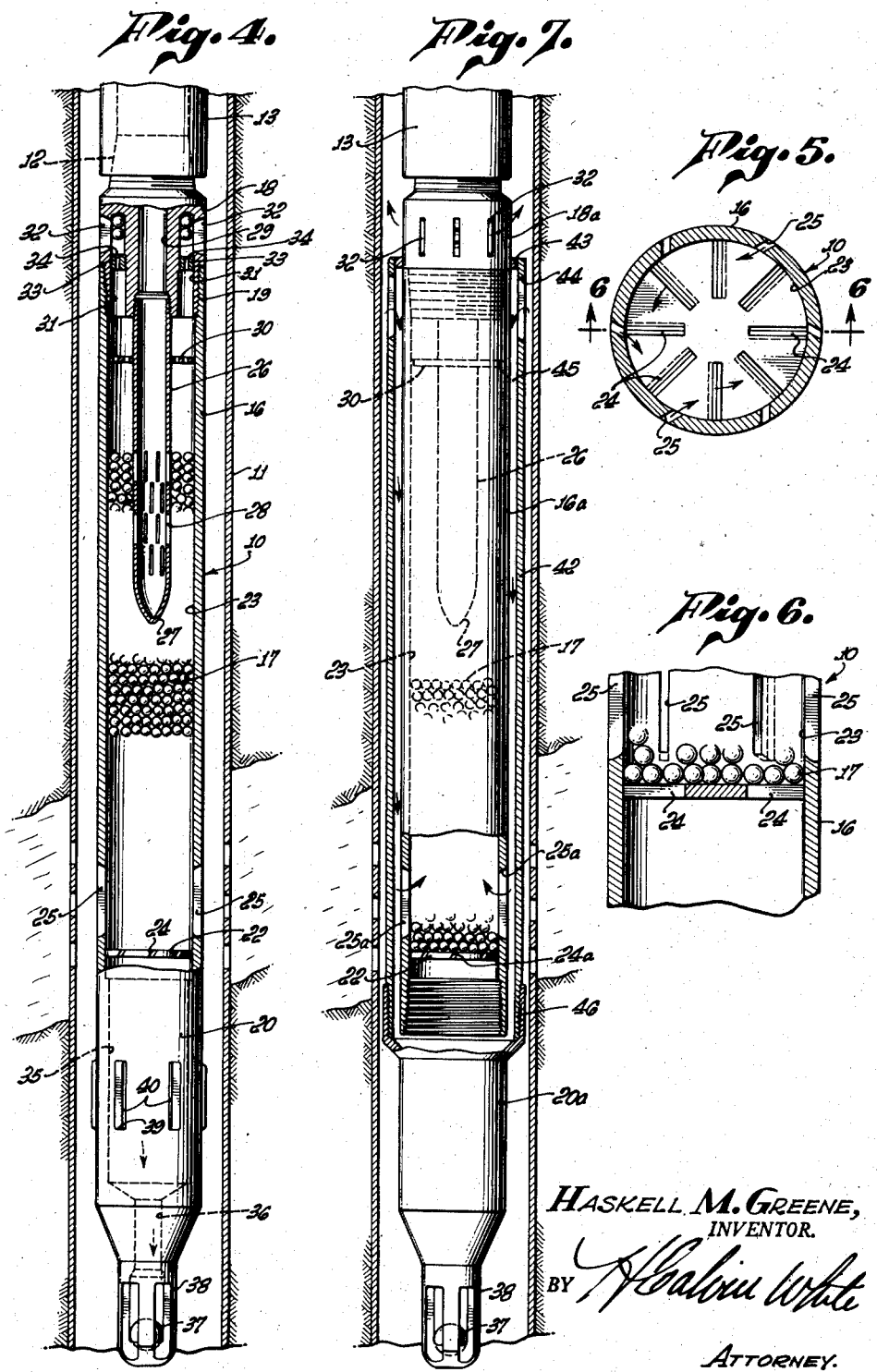
HASKELL M. GREENE,
INVENTOR.
BY
ATTORNEY.

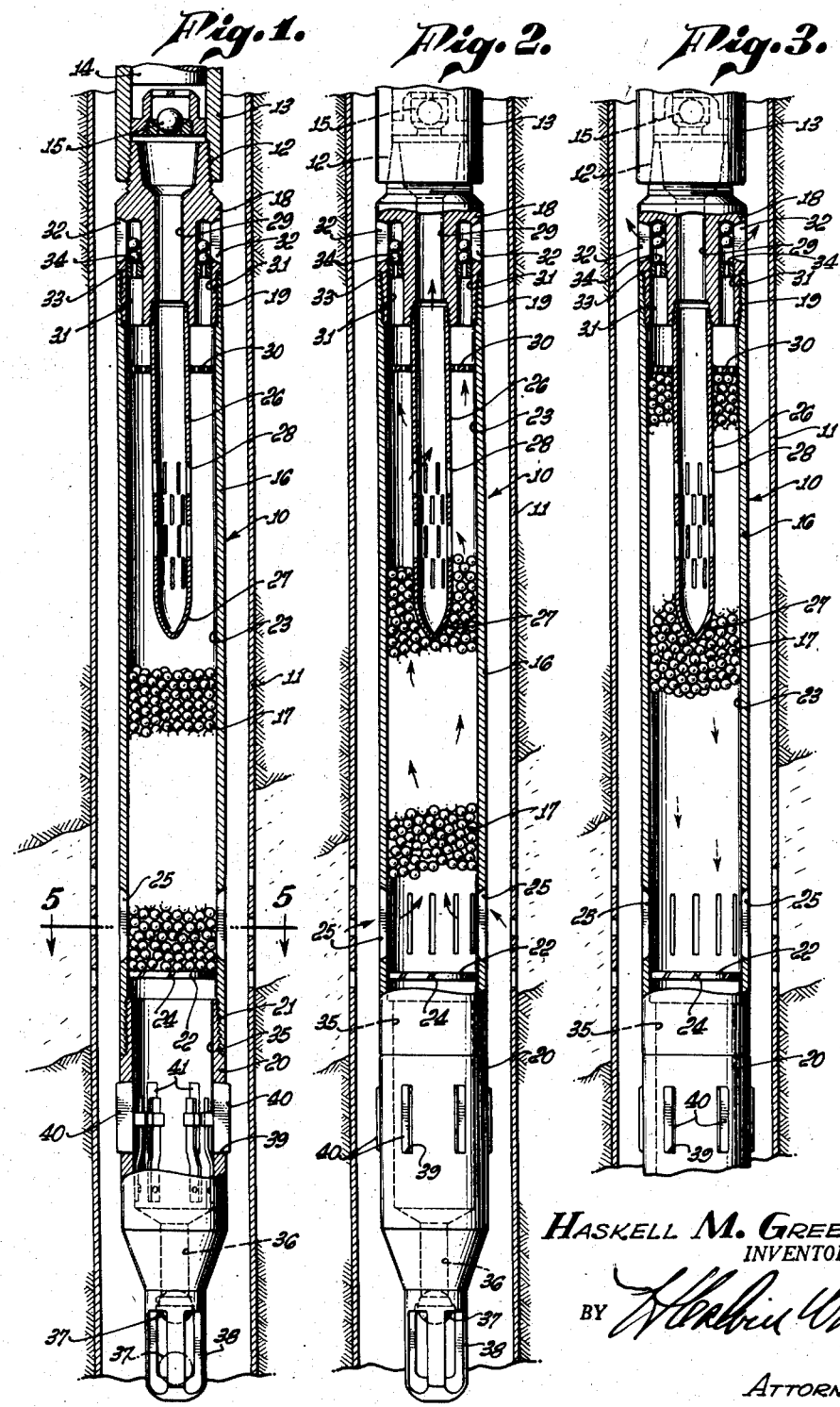

Patented Jan. 12, 1954

2,665,643

UNITED STATES PATENT OFFICE 2,665,643

WELL PUMP FILTER ATTACHMENT

Haskell M. Greene, Whittier, Calif.

Application January 24, 1951, Serial No. 207,627

12 Claims. (Cl. 103—203)

This invention relates to improved filter attachments for use in conjunction with well pumps, and adapted to either or both separate gas from the well liquid handled by a pump, or control the flow of sand or other solids with the well liquid into a pump or production string. More particularly, the invention is directed to improvements in the well pump filter device shown in my Patent Number 2,525,897, issued October 17, 1950 on Well Pipe Filters.

In devices embodying the invention, the filtering of gas and excess solids from a stream of well fluid is effected by directing the fluid through a mobile mass or pack of interengaging filter particles, which particles preferably take the form of glass spheres. This mobile filter pack is rendered extremely efficient by so forming and positioning the mass of particles as to be rather abruptly agitated by the fluid flow on each stroke of the pump piston. Such fluid induced motion of the particles serves the multiple purposes of breaking down the surface tension about any contained gas bubbles, with consequent separation of the gas from the liquid, encouraging the settling out of entrapped solids to thus prevent clogging of the pack, and grinding any large solid particles carried in the fluid to a sand-like condition before permitting their passage from the filter device.

An important object of the invention is to provide a device of the above character so constructed as to impart a maximum velocity to the filter particles upon each pump stroke, to thus maximize the various effects caused by the particle motion. In this connection, a most rapid pack movement is attained by so directing the well fluid as to produce within the filter body a circular and upwardly spiraling movement of both the fluid and the mobile filter mass. When the particles are spherical in shape, such spiraling movement also causes a spinning of the individual spheres about individual axes, to further enhance the filtering effects of the device.

Gases separated from the well liquid in passing through the filter device rise to an upper gas-receiving portion of the filter chamber, from which they are discharged back into the well. Preferably, this upper portion of the chamber is isolated against direct communication with the pump, by forming the liquid outlet passage leading to the pump to communicate with the chamber at only a location spaced beneath the top of the chamber. For this reason, when a liquid outlet tube of the above discussed type is employed, it preferably has an upper imperforate portion, and contains apertures in its side wall opening into the chamber at only the desired location below the top of the chamber.

For most effective discharge of the separated well liquid and gases from the filter device, it is desirable that the liquid, after passing through the filter pack, be discharged through a liquid outlet tube which itself extends directly into the pack containing filter chamber. A particular object of the invention is to so form and position this outlet tube as to provide for efficient liquid discharge, while at the same time minimizing the resistance which the tube offers to the desired movements of the filter particles. Specifically, the liquid outlet tube is constructed to project downwardly from the upper end of the filter chamber toward its bottom, but is formed to terminate above the bottom of, and preferably entirely above, the filter mass, in its condition of repose. As a result of such formation and positioning of the tube, at least a lower portion and preferably all of the pack is free of any engagement with the liquid outlet tube during the initial accelerating stages of its upwardly spiraling movement, to thus assure a relatively uninhibited commencement of the pack movement. The resistance offered by the tube to the upward movement of the pack may be further reduced by specially forming the tube to have a tapered lower end past which the upwardly moving particles are able to move with very little friction. Also the liquid outlet tube may be positioned centrally within the filter chamber and in annularly spaced relation to its tubular side wall, so that the filter pack spirals upwardly directly at the outside of the tube itself.

An additional feature of the invention involves the provision of means for effectively discharging from the filter body excess solids and free water which are separated out by gravity during the filtering process. As will appear, I provide at the lower end of the filter body a bottom chamber, beneath and in communication with the main filter chamber, and into which these materials fall. The accumulated solids and water are then forced from the chamber through a bottom valve-controlled outlet by the usual brief reverse or down pressure surge created during the initial stages of the pump down stroke, i. e., before the pump inlet valve has had an opportunity to seat. Check valve controlled fluid inlets may be formed in a side wall of this lower chamber, above the bottom sand outlet, for admitting fluid during the pump suction stroke to the under side of the upper filter chamber.

A still further object of the invention is to increase the sand separating efficiency of the filter device by requiring the incoming well fluid to follow a relatively extended and circuitous sand separating path before entering the filter chamber and pack. For this purpose, I may provide a tubular sleeve about and in spaced relation to the body of the device, forming an annular elongated space through which the fluid is directed before admission to the filter chamber.

The above and other features and objects of the present invention will be better understood from the following detailed description of the typical embodiments illustrated in the accompanying drawings, in which:

Fig. 1 is a vertical section through a first form of well pump filter attachment embodying the invention, showing the condition of the device just prior to a pump upstroke;

Fig. 2 is a view corresponding to Fig. 1 and showing the condition of the filter during the pump upstroke;

Fig. 3 shows the device at the end of the pump upstroke;

Fig. 4 is a view showing the condition of the device during the short interval at the beginning of a pump downstroke when a brief reverse or down fluid surge is created by the pump;

Fig. 5 is an enlarged horizontal section taken on line 5—5 of Fig. 1;

Fig. 6 is a fragmentary vertical section taken on line 6—6 of Fig. 5; and

Fig. 7 is a partly sectional view of a variational form of filter embodying the invention.

Referring first to Figs. 1 through 6, the filter device 10 of those figures is shown positioned within a well casing 11 and connected by a threaded joint 12 to the lower end of a pump 13, which is carried in the usual manner at the lower end of a production string (not shown). Pump 13 is of the conventional type, including a vertically reciprocable piston 14 and a downwardly seating inlet check valve 15. During the upstroke of piston 14, well fluid is drawn upwardly through the filter attachment 10 and past check valve 15 into the pump. During the major portion of the piston downstroke, valve 15 is closed to prevent reverse or downward fluid flow from the pump and back into the well. It is noted, however, that valve 15, as in all reciprocating pumps of this type, remains open for a short interval at the commencement of each piston downstroke, to thus produce a very short down surge of well fluid as the piston begins its down movement. As will appear, this brief reverse or down surge of fluid is employed in the present device for forcing accumulated gases and solid particles, such as sand, outwardly from the filter body and back into the well.

The body of the filter attachment 10 is formed sectionally of a main vertically extending tubular section 16 containing the filter pack 17, an upper head 18 threadedly connected to section 16 at 19, and a lower sand discharge section 20 connected to section 16 at 21. Near its lower end, the main tubular section 16 contains an apertured horizontal partition 22, forming the bottom wall of an inner chamber 23 within which the filter pack 17 is contained. On the suction stroke of the pump, well fluid is drawn into chamber 23 through a series of radially extending circularly spaced slots 24 in partition 22, and through a series of vertically extending circularly spaced slots 25 in the side wall of section 16 slightly above partition 22. Both the bottom fluid inlet slots 24 and side inlet slots 25 are formed angularly (see Figs. 5 and 6) so that the walls of the slots act as baffles directing the incoming fluid generally tangentially into chamber 23, causing it to follow a circular and upwardly spiraling course of flow within the chamber.

At the upper end of chamber 23, head 18 carries an elongated liquid outlet tube 26, which projects downwardly along the center of the chamber. The lower end 27 of this tube is tapered, and terminates above the bottom wall 22 of chamber 23. Preferably, tube 26 terminates above the filter pack 17, when the pack is in its Fig. 1 condition of repose. Near its lower end, tube 26 contains a series of openings 28 through which the upwardly spiraling liquid in chamber 23 flows into tube 26 for delivery upwardly through head passage 29 to the pump. At a location near the head, liquid outlet tube 26 externally carries a horizontal annular apertured partition 30 forming the upper wall of chamber 23.

Heads 18 contains, at locations spaced about its central liquid outlet passage 29, a series of vertically extending bores 31 and communicating lateral openings 32, through which gases separated from the well liquid by the filter may flow outwardly from the filter body. Each of the bores 31 contains a valve seat element 33 against which a check valve 34 seats, to prevent the inflow of well fluid through these gas escape passages.

The filter pack 17 comprises a mobile mass of interengaging filter particles adapted for upward spiraling movement within chamber 23 and about liquid outlet tube 26 in accordance with the upward spiraling movement of the well fluid. To attain a most effective filtering action, the individual filter particles of the pack 17 preferably take the form of glass spheres of each around $\frac{3}{16}$ to $\frac{1}{4}$ of an inch in diameter.

The lower body section 20 contains a chamber 35 into which fall the sand and other solid particles, and in some instances free water, separated from the well fluid by the filter pack. This lower chamber 35 converges at its lower end to a bottom outlet passage 36 through which the accumulated solids, etc. are forced from the chamber during the brief reverse down surges created by the pump at the beginning of its down strokes. Passage 36 is closed against the inflow of well fluid during the piston upstroke by a ball check valve 37 vertically movable in guide cage 38. Valve 37 preferably has a specific gravity slightly less than the well fluid, to normally tend to return to its up or closed position of Fig. 1.

Above the bottom sand discharge passage 36, the side wall of lower body section 20 contains a series of circularly spaced vertically elongated well fluid inlet openings 39. Check valves 40 for closing inlet openings 39 are carried and normally urged to their closed conditions by individual leaf spring mounting arms 41. As will be appreciated, valves 40 open during the piston upstroke to admit well fluid into chamber 35 for passage upwardly through apertured partition 22 into chamber 23. On the piston downstroke, these valves close to prevent outward fluid flow.

In discussing the operation of the filter as a whole, reference is first made to Fig. 1, which represents the condition of the device just prior to the commencement of a piston upstroke. At that moment, the filter pack is in a condition of repose at the bottom of chamber 23, and the various valves 15, 34, 37 and 40 are all closed. As the pump piston 14 is then moved upwardly, well fluid is drawn into the bottom of chamber 23 through both the bottom and side inlets 24 and 25. The admission of well fluid into lower chamber 35 for passage upwardly through inlet slots 24 in bottom wall 22 is rendered possible by the opening of valves 40, under the influence of the pump created suction. The fluid flow into chamber 35 through openings 39 is entirely above any body of sand or the like which may have accumulated at the bottom of chamber 35 during the last pump stroke, to thus avoid any disturbance of that accumulated material.

Inlets 24 and 25 direct the incoming well fluid in a circular and upwardly spiraling course of flow within chamber 23. At the same time, this motion of the fluid imparts a corresponding upward spiraling motion to the mass of glass spheres 17. These spheres move upwardly through the condition of Fig. 2 and to the condition of Fig. 3, in which they spiral about the liquid outlet tube 26. As will be appreciated, the termination of liquid outlet tube 26 above the bottom of the filter pack, and preferably entirely above it, in the Fig. 1 condition of repose, prevents undue interference by the outlet tube with the motion of the pack. Also, the formation of tube 26 to have a lower tapered end minimizes the resistance to upward pack movement offered by tube 26. As the spheres spiral upwardly, their spherical formation causes them at the same time to assume individual spinning motions.

The rapid motion of the glass spheres as the well fluid is drawn upwardly through the filter pack for entry into tube 26 and delivery to the pump serves to break down the surface tension of the well liquid about any contained gas bubbles, and as a result separate out the gas before the liquid passes on into tube 26. The separated gas rises upwardly in chamber 23 for discharge through outlets 31 and 32 and past check valves 34. At the same time, the requirement that the fluid pass through the filter pack before entry into outlet tube 26 causes the excess sand, other solids, and free water to be separated from the fluid and fall downwardly through apertured partition 22 into the bottom of lower chamber 35. The filter thus acts to control the amount of sand and the like flowing into the pump with the liquid, to permit no more of these materials to enter the pump than can be retained in suspension.

Fig. 4 represents the condition of the apparatus during the initial portion of a pump downstroke at the moment when the delayed seating of pump valve 15 has caused the development of a brief down surge of fluid into the filter body. This down surge serves the dual purposes of forcing the last part of the separated gas from the filter body past check valves 34, and forcing the sand and other materials in the bottom of lower chamber 35 outwardly through bottom discharge passage 36. As the pump downstroke then continues, the filter pack 17 falls back to its Fig. 1 position, and upon engagement with bottom wall 22, pounds out remaining solid matter, which falls into the bottom of chamber 35 for discharge on the next pump stroke.

In the Fig. 7 variational form of the invention, the construction of the main tubular body section 16a, head 18a and their various contained parts is the same as in Figs. 1 to 6. This second form of the invention differs mainly in the provision of an outer tubular sleeve 42 positioned about and in annularly spaced relation to body section 16a to require that incoming well fluid follows an extended sand separating path before its admission into the filter chamber. This sleeve 42 is mounted at its upper end by a threaded connection 43 to head 18a. Near its upper end, sleeve 42 contains a series of circularly spaced fluid inlet openings 44 through which well fluid enters the relatively narrow annular spaces 45 between body section 16a and the sleeve. The fluid is required to flow downwardly through spaces 45 before being permitted to enter body 16a through either bottom inlets 24a or side inlets 25a. Such downward movement of the fluid causes a certain amount of the sand and other solids to fall downwardly into the bottom solid collecting section 20a. This bottom section corresponds generally to bottom section 20 of the first form of the invention, and serves the same general purpose. However, section 20a of Fig. 7 is threadedly connected at 46 to sleeve 42, rather than to body section 16a as in Fig. 1, so that section 20a receives sand separated in both the annular spaces 45 and the inner filter chamber. Also, section 20a has no fluid inlet check valves corresponding to valves 40 of the first form, since it is desired that all fluid follow the extended inlet course through spaces 45.

I claim:

1. A well pump filter device comprising a body adapted to be positioned in a well with a pump and containing a vertically extending chamber through which fluid taken from the well by the pump is passed, a mobile mass of interengaging filter particles in said chamber, means directing well fluid through said mass of particles in the chamber and causing agitation of the particles by the fluid flow, and a fluid outlet tube projecting downwardly into said chamber and through which the fluid is discharged therefrom, said outlet tube terminating downwardly at a location above the bottom of the particle mass in its condition of repose.

2. A well pump filter device comprising a body adapted to be positioned in a well with a pump and containing a vertically extending chamber through which fluid taken from the well by the pump is passed, a mobile mass of interengaging filter particles in said chamber, means directing well fluid through said mass of particles in the chamber and causing agitation of the particles by the fluid flow, and a fluid outlet tube projecting downwardly into said chamber and through which the fluid is discharged therefrom, said outlet tube containing an opening communicating with said chamber, and said tube terminating in a lower tapered end at a location above the particle mass in its condition of repose.

3. A well pump sand and gas filtering device comprising a body adapted to be positioned in a well at the bottom of a pump and containing a vertically extending chamber through which fluid taken from the well by the pump is passed, a mobile mass of interengaging filter particles within said chamber, means directing liquid and gaseous well fluid through said mass and upwardly through the body to be taken by the pump, said particles being subject to agitation by said fluid and acting to promote separation of gas from the liquid flowing through the chamber, means forming an escape passage for discharging to the exterior of said body gas separating from the liquid after its passage through said particle mass, and a liquid outlet tube projecting downwardly into said chamber and terminating downwardly at a location above the bottom of the particle mass in its condition of repose.

4. A well pump filter trap comprising a vertically extending body containing a pair of upper and lower chambers, a perforated transverse partition separating said chambers, a mobile mass of interengaging filter particles in the upper chamber, said body containing a well fluid inlet passage in the side wall of said lower chamber through which fluid is admitted to flow upwardly through the partition and particle mass to be taken by the pump at the upper end of the body, a check valve preventing fluid flow outwardly through said inlet passage, said particle mass acting to separate sand from the fluid to fall downwardly through said perforated partition into the lower chamber, said body containing a sand outlet at the lower end of said second chamber through which the sand is forced outwardly by reverse downward fluid surges, and a second check valve preventing fluid inflow through said sand outlet.

5. A well pump sand and gas filtering device comprising a body adapted to be positioned in a well at the bottom of a pump and containing a vertically extending chamber through which fluid taken from the well by the pump is passed, a mobile mass of interengaging filter particles in said chamber, said body containing a passage leading from the outside thereof and directing well fluid through said mass and upwardly in the body to be taken by the pump, an outer tubular sleeve carried about the body in spaced relation thereto, and inlet means for admitting well fluid into the space between said body and sleeve at a location vertically offset from said body passage, said sleeve being substantially closed to fluid inflow except at said inlet means to require the passage of incoming fluid through said space for separation of sand therefrom.

6. A well pump sand and gas filtering device comprising a body adapted to be positioned in a well at the bottom of a pump and containing a vertically extending chamber through which fluid taken from the well by the pump is passed, a mobile mass of interengaging filter particles in said chamber, said body containing a passage leading from the outside thereof and directing well fluid through said mass and upwardly in the body to be taken by the pump, an outer tubular sleeve carried about the body in spaced relation thereto, inlet means for admitting well fluid into the space between said body and sleeve at a location spaced above said body passage, a member carried at the lower end of said sleeve and forming a bottom chamber communicating with the body chamber and said space to receive sand falling therefrom, means forming a sand outlet at the lower end of said bottom chamber through which sand is forced outwardly by reverse downward pressure surges in the body chamber, and a check valve preventing fluid flow into the bottom chamber through said sand outlet, said sleeve member being substantially closed to fluid inflow except at said inlet means to require the passage of incoming fluid through said space for separation of sand therefrom.

7. A well pump filter device comprising a body adapted to be positioned in a well with a pump and containing a vertically extending chamber through which fluid taken from the well by the pump is passed, means forming an inlet admitting liquid and gaseous well fluid into said chamber, a mobile mass of interengaging filter particles in the path of fluid flow through the chamber adapted for agitation by the fluid and acting to separate gases from the well liquid, a liquid outlet tube extending downwardly into said chamber from the upper end thereof and terminating downwardly in a closed lower end at a location above the particle mass in its condition of repose, said tube containing a liquid discharge passage leading to an associated pump and communicating with the chamber at a predetermined location spaced beneath the top of the chamber, the wall of said tube being imperforate above said location and forming with said body an enclosed upper gas-receiving portion of the chamber, gas outlet means for separately discharging gases from said enclosed upper portion of the chamber, and check valve means preventing fluid inflow through said gas outlet means.

8. A well pump filter device comprising a body adapted to be positioned in a well with a pump and containing a vertically extending chamber through which fluid taken from the well by the pump is passed, a mobile and vertically displaceable mass of interengaging filter particles in said chamber, said body containing an inlet passage leading well fluid into said chamber for passage therethrough, said particles acting to promote separation of gas from the liquid flowing through the chamber, said chamber having an upper gas outlet means and spaced therebelow and above said inlet, a liquid outlet communicable with the pump, said body being constructed to form an upper gas-receiving portion of the chamber above said liquid outlet enclosed against communication with the pump above the outlet, and said inlet passage extending into the chamber at such an angle as to direct the well fluid in a spiraling course of flow within the chamber as it moves upwardly toward the liquid outlet and to cause by the fluid flow a corresponding upward spiraling displacement of said particles.

9. A well pump filter device comprising a body adapted to be positioned in a well with a pump and containing a vertically extending chamber through which fluid taken from the well by the pump is passed, said body including a tubular vertically extending side wall of said chamber, and a mobile and vertically displaceable mass of interengaging filter particles in said chamber, said body containing an inlet directing well fluid into said chamber at a first location and an outlet leading fluid from the chamber at a second and higher location, and said trap including baffle means constructed and positioned to direct the well fluid entering said chamber from the inlet in a spiraling course of flow as it moves upwardly toward said outlet and to cause by the fluid flow an upwardly spiraling displacement of said particles.

10. A well pump filter trap as recited in claim 9, including means in the upward path of said fluid and particles for separately flowing liquid upwardly through the top of the body and gas outwardly to the exterior of the body.

11. A well pump filter device comprising a body adapted to be positioned in a well with a pump and containing a vertically extending chamber through which fluid taken from the well by the pump is passed, said body including a tubular vertically extending side wall of said chamber, and a mobile and vertically displaceable mass of interengaging filter particles in said chamber, said body containing a well fluid inlet passage extending through a wall of the chamber near the bottom thereof, said body containing an outlet communicating with the chamber at a location higher than the inlet, and said inlet passage extending through said wall of the chamber in such a direction as to direct the well fluid in a spiraling course of flow as it flows upwardly toward the outlet and to cause by the fluid flow a corresponding upward spiraling displacement of said particles.

12. A well pump filter device comprising a body adapted to be positioned in a well with a pump and containing a vertically extending chamber through which fluid taken from the well by the pump is passed, a mobile and vertically displaceable mass of interengaging filter particles in said chamber, and a fluid outlet tube projecting downwardly into and communicating at a first location with the chamber and terminating downwardly at a location above the bottom of the particle mass in its condition of repose, said body containing a well fluid inlet passage communicating with the chamber at a location lower than said first location and extending in such a direction as to direct the well fluid in a circular and upwardly spiraling course of flow into said outlet tube and to cause by the fluid flow a corresponding upward spiraling displacement of the particles.

HASKELL M. GREENE.

References Cited in the file of this patent

UNITED STATES PATENTS

| Number | Name | Date |
|---|---|---|
| 1,450,333 | Reed | Apr. 3, 1923 |
| 1,554,835 | Barrett | Sept. 22, 1925 |
| 1,578,720 | Derby | Mar. 30, 1926 |
| 1,601,921 | McCoy | Oct. 5, 1926 |
| 1,628,900 | Neilson | May 17, 1927 |
| 2,525,897 | Greene | Oct. 17, 1950 |